United States Patent
Forsgren et al.

(10) Patent No.: US 9,532,326 B2
(45) Date of Patent: Dec. 27, 2016

(54) FREQUENCY OFFSET ESTIMATION BETWEEN A MOBILE COMMUNICATION TERMINAL AND A NETWORK NODE

(75) Inventors: Eva Margaretha Forsgren, Sollentuna (SE); Oskar Mauritz, Johanneshov (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 36 days.

(21) Appl. No.: 14/400,747

(22) PCT Filed: May 14, 2012

(86) PCT No.: PCT/SE2012/050510
§ 371 (c)(1),
(2), (4) Date: Nov. 12, 2014

(87) PCT Pub. No.: WO2013/172748
PCT Pub. Date: Nov. 21, 2013

(65) Prior Publication Data
US 2015/0139098 A1    May 21, 2015

(51) Int. Cl.
*H04L 27/26* (2006.01)
*H04W 56/00* (2009.01)
(Continued)

(52) U.S. Cl.
CPC ...... *H04W 56/0035* (2013.01); *H04L 25/0224* (2013.01); *H04L 27/2657* (2013.01); *H04W 74/0833* (2013.01); *H04W 74/0866* (2013.01)

(58) Field of Classification Search
None
See application file for complete search history.

(56) References Cited

U.S. PATENT DOCUMENTS

| 6,618,452 B1 | 9/2003 | Huber et al. |
| 2007/0019749 A1* | 1/2007 | Gaikwad ............ H04L 27/2657 375/260 |

(Continued)

FOREIGN PATENT DOCUMENTS

| WO | WO 2009/018655 | 2/2009 |
| WO | WO 2010/040264 | 4/2010 |

(Continued)

OTHER PUBLICATIONS

3rd Generation Partnership Project; Technical Specification Group Radio Access Network; Evolved Universal Terrestrial Radio Access (E-UTRA); Physical Channels and Modulation (Release 8) 2009.

(Continued)

*Primary Examiner* — Benjamin Lamont
(74) *Attorney, Agent, or Firm* — Baker Botts, LLP

(57) ABSTRACT

There is disclosed a method for estimating a frequency offset between a mobile communication terminal and a network node. The method is based on processing, by means of a matched filter, a preamble sequence for random access received on a physical random access channel, PRACH. Thus the method is preferably applied in the Evolved Universal Terrestrial Radio Access (E-UTRA) network. In the matched filtered preamble sequence two peaks are determined and the frequency offset is based on a ratio of the two peaks. A corresponding network node, computer program and computer program product are also presented. The network node is preferably performed in a network node of the type eNodeB, E-UTRAN NodeB, also known as Evolved NodeB.

18 Claims, 4 Drawing Sheets

(51) Int. Cl.
*H04L 25/02* (2006.01)
*H04W 74/08* (2009.01)

(56) References Cited

U.S. PATENT DOCUMENTS

| | | | | |
|---|---|---|---|---|
| 2007/0069864 A1* | 3/2007 | Bae | H04B 5/02 | 340/10.2 |
| 2008/0095249 A1* | 4/2008 | Yoon | H04L 27/2657 | 375/260 |
| 2009/0154627 A1* | 6/2009 | Park | H04L 27/2659 | 375/365 |
| 2009/0213968 A1* | 8/2009 | Tormalehto | H04W 74/0833 | 375/343 |
| 2010/0040044 A1* | 2/2010 | Izumi | H04L 7/042 | 370/350 |
| 2010/0188286 A1* | 7/2010 | Bickerstaff | G01S 5/0205 | 342/357.22 |
| 2010/0220664 A1* | 9/2010 | Hooli | H04L 7/041 | 370/329 |
| 2011/0086658 A1* | 4/2011 | Baldemair | H04J 13/0059 | 455/507 |
| 2011/0293040 A1* | 12/2011 | Dupont | H03H 21/0018 | 375/316 |

FOREIGN PATENT DOCUMENTS

| | | |
|---|---|---|
| WO | WO 2012/036605 | 3/2012 |
| WO | WO 2013/001474 | 1/2013 |

OTHER PUBLICATIONS

PCT Written Opinion of the International Searching Authority for International application No. PCT/SE2012/050510 Jan. 18, 2013.
International Search Report for International application No. PCT/SE2012/050510 Jan. 18, 2013.

* cited by examiner

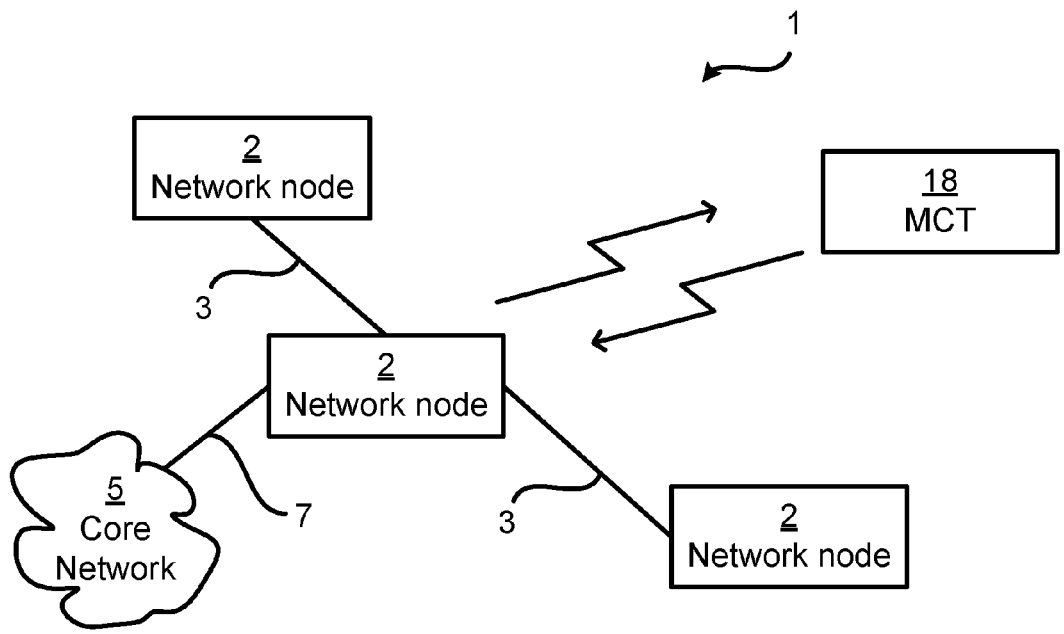
Fig. 1
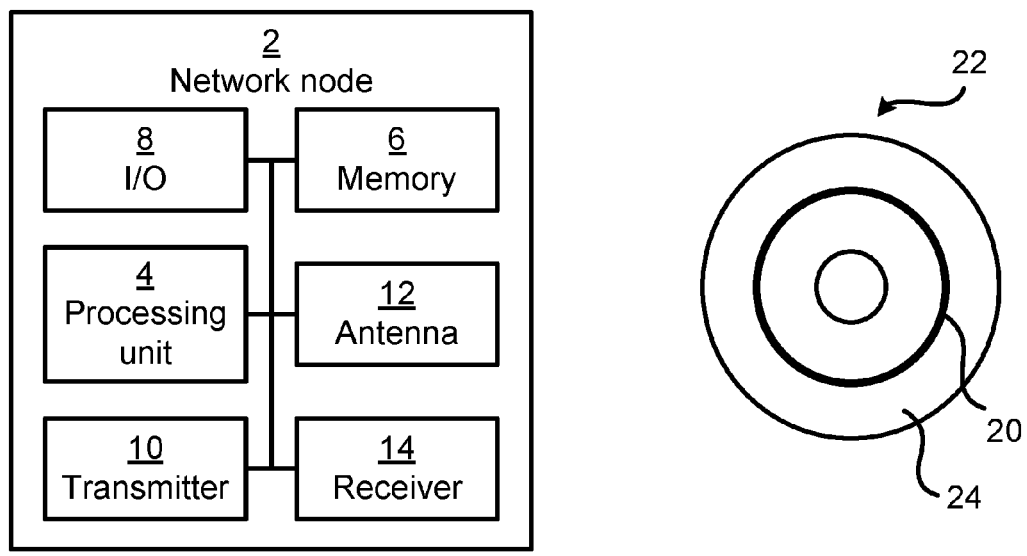
Fig. 2
Fig. 5

FREQUENCY OFFSET ESTIMATION BETWEEN A MOBILE COMMUNICATION TERMINAL AND A NETWORK NODE

PRIORITY

This nonprovisional application is a U.S. National Stage Filing under 35 U.S.C. §371 of International Patent Application Ser. No. PCT/SE2012/050510, filed May 14, 2012 and entitled "A Frequency Offset Estimation Between a Mobile Communication Terminal and a Network Node."

TECHNICAL FIELD

Embodiments presented herein relate to estimating a frequency offset between a mobile communication terminal and a network node.

BACKGROUND

In mobile communication networks, there is always a challenge to obtain good performance and capacity for a given communications protocol, its parameters and the physical environment in which the mobile communication network is deployed.

In a mobile communications network the motion of the mobile communication terminals (inter alia mobile phones, laptop computers, etc.) in relation to the network nodes (base stations) may cause a Doppler shift, i.e. a frequency offset inter alia of the uplink radio signal (i.e. a signal being transmitted from the mobile communication terminal to the network node) that in turn may degrade the uplink receiver performance. Typically the frequency offset increases as the speed of the relative motion between mobile communication terminal and the network node increases.

In the mobile communications system denoted the Evolved Universal Terrestrial Radio Access (E-UTRA) network there are three uplink channels: the Physical Random Access Channel (PRACH), the Physical Uplink Shared Channel (PUSCH), and the Physical Uplink Control Channel (PUCCH). PRACH has a special mode to deal with high frequency offsets and does not require frequency offset compensation. For PUSCH and PUCCH, on the other hand, frequency offset compensation may be needed in order to mitigate performance degradation at high frequency offsets.

The frequency offset estimation on PUSCH and PUCCH can be based on the phase changes of the received reference signals transmitted together with the data. However, the distribution of the reference signals within PUSCH and PUCCH lead to an ambiguity in the frequency offset estimates due to aliasing.

In E-UTRA the mobile communication terminal, termed User Equipment (UE), connects to the network by first sending a random access preamble on PRACH and then sending a random access message on PUSCH. Since no PUCCH signal has been received before the PUSCH transmission the ambiguity in the frequency offset estimate for PUSCH is not resolved.

SUMMARY

An object of embodiments herein is to provide estimation of frequency offset between a mobile communication terminal and a network node in a mobile communications network. It has been observed that the ambiguity in the frequency offset estimate for PUSCH can generally be resolved by estimating the frequency offset on PRACH and particularly by combining two frequency peaks. A particular object is therefore to provide frequency offset estimation based on PRACH. The frequency offset estimate is preferably based on the ratio of two peaks corresponding to the same delay of a random access preamble in the processed output of the PRACH receiver.

According to a first aspect there is presented a method for estimating a frequency offset between a mobile communication terminal and a network node, the method being performed in the network node, comprising the steps of: receiving a preamble sequence for random access on a physical random access channel, PRACH, originating from the mobile communication terminal; processing the preamble sequence for random access, thereby generating an output sequence; determining a first peak in the output sequence and a second peak in the output sequence, wherein the first peak and the second peak correspond to the same delay in the output sequence; and determining a frequency offset estimate based on a ratio of the first peak and the second peak.

A method to estimate the frequency offset for received signals based on PRACH information is thereby provided. This frequency offset estimate can advantageously be used to resolve the ambiguity in the frequency offset estimate on PUSCH when PUSCH is received before PUCCH from the same mobile communication terminal.

Using PRACH to determine the frequency offset estimate is advantageous since PRACH by itself deals with high frequency offsets and does not require frequency offset compensation and hence itself is robust against frequency offsets.

Further, advantageously the range of frequency offsets that can be unambiguously estimated is extended. Thereby the physical speed of a mobile communication terminal that can be served by the mobile network can be increased.

Advantageously this enables the network node to, at carrier frequencies in the order of 2.6 GHz, establish a wireless radio based communication connection with a mobile communication terminal moving at a speed in the order of 300 km/h. Advantageously this enables the network node to, at carrier frequencies in the order of 2.6 GHz, communicate with a mobile communication terminal moving at a speed in the order of 300 km/h.

According to a second aspect there is presented a network node for estimating a frequency offset between a mobile communication terminal and said network node. The network node comprises a receiver arranged to receive a preamble sequence for random access on a physical random access channel, PRACH, originating from the mobile communication terminal. The network node comprises a processing unit arranged to process the preamble sequence for random access, thereby generating an output sequence. The processing unit is further arranged to determine a first peak in the output sequence and a second peak in the output sequence, wherein the first peak and the second peak correspond to the same delay in the output sequence. The processing unit is further arranged to determine the frequency offset estimate based on a ratio of the first peak and said second peak. The receiver may be part of a transceiver.

According to a third aspect there is presented a computer program for estimating a frequency offset between a mobile communication terminal and a network node, the computer program comprising computer program code which, when run on a network node, causes the network node to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the invention will now be described, by way of non-limiting examples, references being made to the accompanying drawings, in which:

FIG. 1 is a schematic diagram illustrating a mobile communication network where embodiments presented herein may be applied;

FIG. 2 is a schematic diagram showing functional modules of a network node;

FIG. 5 shows one example of a computer program product comprising computer readable means;

DETAILED DESCRIPTION

Figure 3:
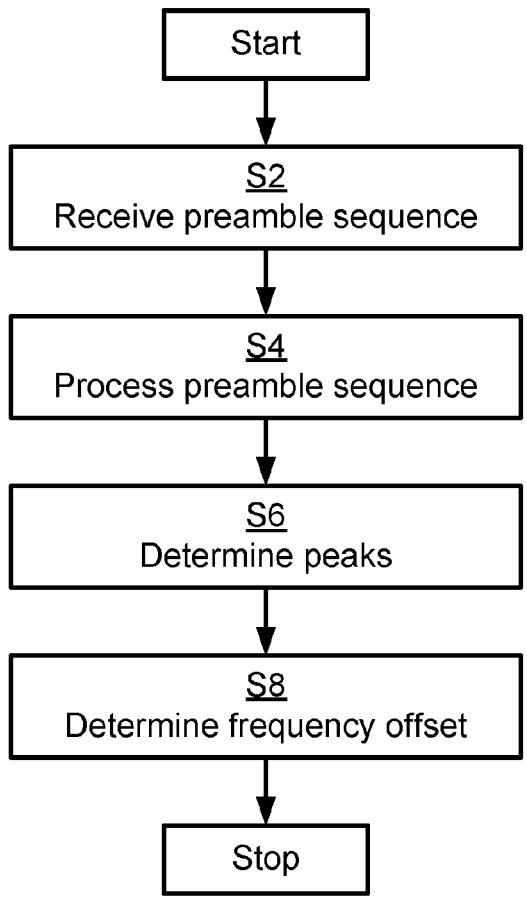
FIGS. 3 and 4 are flowcharts of methods according to embodiments.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

FIG. 1 is a schematic diagram illustrating a mobile communication network 1 where embodiments presented herein can be applied. The mobile communications network comprises network nodes 2 and a mobile communication terminal (MCT) 18. The term mobile communication terminal 18 is also known as user equipment, mobile terminal, user terminal, user agent, etc. The mobile communication network 1 may generally comply with any one or a combination of W-CDMA (Wideband Code Division Multiplex), LTE (Long Term Evolution), EDGE (Enhanced Data Rates for GSM Evolution, Enhanced GPRS (General Packet Radio Service)), CDMA2000 (Code Division Multiple Access 2000), etc., as long as the principles described hereinafter are applicable. Preferably the mobile communication network 1 is the E-UTRA network. Typically the E-UTRA network consists only of network nodes 2 in the form of eNodeBs (E-UTRAN NodeB, also known as Evolved NodeB) on the network side. A traditional NodeB typically has minimum functionality, and is controlled by an RNC (Radio Network Controller). NodeB is a term used in UMTS (Universal Mobile Telecommunications System) equivalent to the BTS (base transceiver station) description used in the Global System for Mobile Communications (GSM). It is the hardware that is connected to the mobile phone network that communicates directly with the mobile communication terminal 18. The eNodeB (as represented by each one of the network nodes 2 in FIG. 1) performs tasks similar to those performed together by the NodeBs and the RNC (radio network controller) in UTRA. The aim of the E-UTRA simplification is generally to reduce the latency of radio interface operations. eNodeBs are typically connected to each other via the so-called X2 interface (as illustrated by reference numeral 3), and they connect to the packet switched (PS) core network 5 via the so-called S1 interface (as illustrated by reference numeral 7).

FIG. 2 schematically illustrates, in terms of a number of functional modules, the components of a network node 2. A processing unit 4 is provided using any combination of one or more of a suitable central processing unit (CPU), multi-processor, microcontroller, digital signal processor (DSP), application specific integrated circuit (ASIC) etc., capable of executing software instructions stored in a computer program product 22 (as in FIG. 5), e.g. in the form of a memory 6. Thus the processing unit 4 is thereby preferably arranged to execute methods as herein disclosed. The memory 6 may also comprise persistent storage, which, for example, can be any single one or combination of magnetic memory, optical memory, solid state memory or even remotely mounted memory.

The network node 2 may further comprise an input/output (I/O) interface 8 for communicating with the core network 5 and optionally with other network nodes. The network node 2 also comprises one or more transmitters 10 and receivers 14, comprising analogue and digital components forming the functionalities of a transmitter and a receiver, and a suitable number of antennas 12 for radio communication with mobile communication terminals 18 within one or more radio cells. The processing unit 4 controls the general operation of the network node 2, e.g. by sending control signals to the transmitter 10 and/or receiver 14 and receiving reports from the transmitter 10 and/or receiver 14 of its operation. In one embodiment, the I/O interface 8 is directly connected to the transmitter 10 and receiver 14, whereby data to and from the core network 5 is directly routed between the I/O interface 8 and the transmitter 10 and receiver 14.

Generally, the network nodes 2 provide radio connectivity to a plurality of mobile communication terminals 18. The communication between each one of the mobile communication terminals 18 and the network nodes 2 occurs over a wireless radio interface. On the uplink (i.e. signals transmitted from the mobile terminals 18 to the receiver 14 of the network node 2) there are three physical channels. The Physical Random Access Channel (PRACH) is used for initial access and when the mobile terminal 18 loses its uplink synchronization with the network node 2. The Physical Uplink Shared Channel (PUSCH) carries the physical layer uplink transport data together with control information. The Physical Uplink Control Channel (PUCCH) carries control information. The uplink control information typically consists only of data layer acknowledgements as well as channel quality indication related reports as all the uplink coding and allocation parameters are known by the network side (herein represented by the network nodes 2) and signalled to the mobile communication terminal 18 on the downlink physical control channel. On the uplink in E-UTRA there are also Reference Signals (RS) used by the eNodeB to estimate the uplink channel to decode the terminal uplink transmission and Sounding Reference Signals (SRS) used by the eNodeB to estimate the uplink channel conditions for each mobile communication terminal 18 to decide the best uplink scheduling.

Other components, as well as the related functionality, of the network nodes 2 are omitted in order not to obscure the concepts presented herein.

Figure 4:
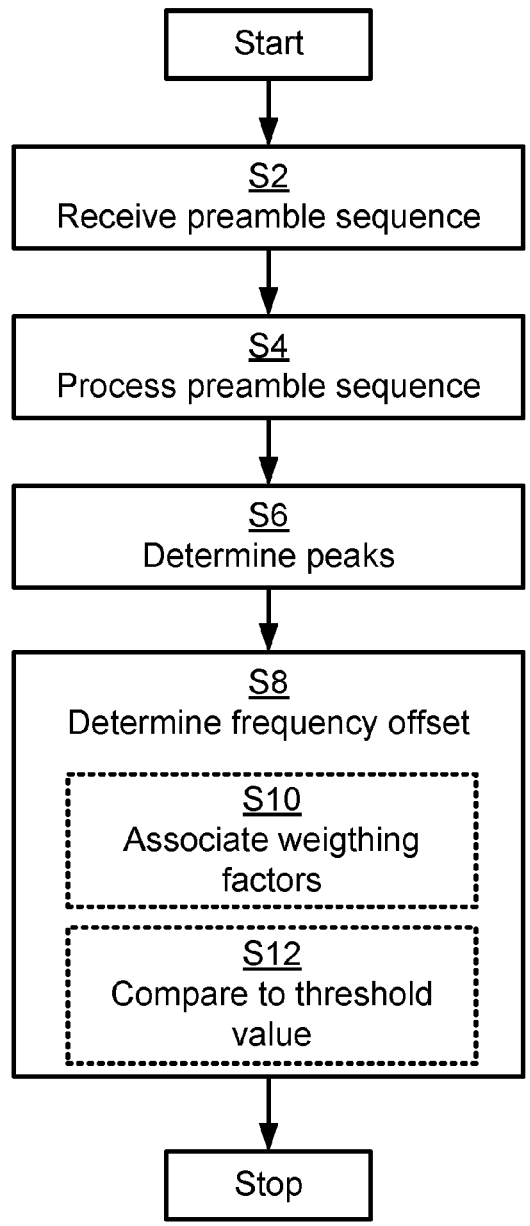

FIGS. 3 and 4 are flow charts illustrating embodiments of methods for estimating a frequency offset between a mobile communication terminal 18 and a network node 2. The methods are preferably performed in the network node 2. The methods are advantageously provided as computer programs 20. FIG. 5 shows one example of a computer program product 22 comprising computer readable means 24. On this computer readable means 24, a computer program 20 can be stored, which computer program 20 can cause the processing unit 6 and thereto operatively coupled entities and devices, such as the memory 6, the I/O interface 8, the transmitter 10, the receiver 14 and/or the antenna 12 to execute methods according to embodiments described herein. In the example of FIG. 5, the computer program product 22 is illustrated as an optical disc, such as a CD (compact disc) or a DVD (digital versatile disc) or a Blu-Ray disc. The computer program product could also be embodied as a memory (RAM, ROM, EPROM, EEPROM) and more particularly as a non-volatile storage medium of a device in an external memory such as a USB (Universal Serial Bus) memory. Thus, while the computer program 20 is here schematically shown as a track on the depicted optical disk, the computer program 20 can be stored in any way which is suitable for the computer program product 22.

Figure 6:
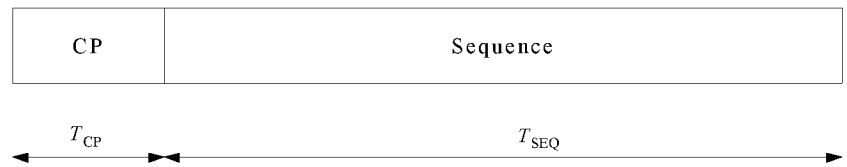
FIG. 6 schematically illustrates a random access preamble sequence.

The message transmitted on PRACH is conveyed by a so-called physical layer random access preamble. This random access preamble, as illustrated in FIG. 6 consists of a cyclic prefix (CP) of length $T_{CP}$ and a sequence part of length $T_{SEQ}$. The parameter values generally depend on the frame structure and the random access configuration. Higher layers control the preamble format. The transmission of a random access preamble, if triggered by the Media Access Control (MAC) layer, is restricted to certain time and frequency resources. These resources are enumerated in increasing order of the subframe number within the radio frame and the physical resource blocks in the frequency domain such that index o correspond to the lowest numbered physical resource block and subframe within the radio frame. PRACH resources within the radio frame are indicated by a PRACH resource index. In a step S2 the receiver 14 of the network node 2 receives the PRACH preamble sequence.

The PRACH preamble sequence is processed (by the processing unit 6 of the network node 2), step S4, thereby generating an output sequence. In order to detect random access preambles the PRACH receiver 14 comprises suitable detection means generating an output sequence representative of the detection result of the detection means. According to one embodiment the PRACH receiver 14 comprises a matched filter, i.e. a filter with taps having values (i.e. coefficients) which are matched to the preamble sequence. Reception of a random access preamble on PRACH thereby gives rise to one or several peaks processing output (such as in the matched filter output). Particularly, in a step S6 a first peak in the output sequence and a second peak in the output sequence, are determined (preferably by the processing unit 4). The first peak and the second peak correspond to the same delay in the output sequence. In more detail, if the random access preamble is subject to a large enough frequency offset the locations of the peaks will change. The location of the peaks is generally determined by the delays of the paths carrying the random access preamble, its frequency offset, and its periodic ambiguity function.

The random access preamble, its periodic ambiguity function, and the effect of a frequency offset on the matched filter output will now be described in detail.

As noted above, the random access preamble in E-UTRA consists of a preamble sequence with a cyclic prefix. Hence the random access preamble is a periodic extension of the preamble sequence. The preamble sequence of length $N_{ZC}$ is denoted as $x_{u,v}(n)$, $n=0, 1, \ldots, N_{ZC}-1$ and may be described as a cyclically shifted version of a root sequence $x_u(n)$, which is a Zadoff-Chu sequence given by $$x_u(n) = e^{-j\frac{\pi u n(n+1)}{N_{ZC}}}, \quad (1)$$

$$n = 0, 1, \ldots, N_{ZC} - 1$$

where u denotes the physical root sequence index (i.e., an integer satisfying $0<u<N_{ZC}$). To simplify the notation the root sequence will, without loss of generality, in the following be periodically extended to all integer values n so that the sequence becomes periodic in n with period $N_{ZC}$ and a cyclic shift becomes a linear shift. The preamble sequence is then obtained as $$x_{u,v}(n)=x_u(n+C_v), n=0,1, \ldots, N_{ZC}-1$$

for some cyclic shift $C_v$. The $N_{ZC}$ samples of the cyclically shifted Zadoff-Chu sequence are according to E-UTRA transmitted in $T_{SEQ}=0.8$ ms.

As noted above, the preamble sequence is received by the network node. In presence of a frequency offset f and with the channel $h(\tau)$ modelled as a tapped delay line, $$h(\tau) = \sum_i h_i \delta(\tau - l_i T_s),$$

where the sum is over all channel taps, where $\tau$ is the delay, where $h_i$ are propagation channel coefficients, where $\delta$ is the Dirac delta function, and where $l_i$ are the corresponding integer-valued delays in units of the sequence sample period $T_s=T/N_{ZC}$, the received signal r(n) sampled over the length of the preamble sequence is obtained as $$r(n) = \sum_i h_i x_u(n + C_v - l_i)e^{j2\pi f T_s n} + w(n),$$

$$n = 0, 1, \ldots, N_{ZC} - 1$$

where w(n) denotes white Gaussian noise.

In the PRACH receiver 14 of the network node 2, the received signal is, as noted above, processed and preferably input to a matched filter, although processing of the received signal may be performed by any suitable circuitry. Each preamble sequence is preferably associated with a unique set of intervals in the matched filter output. The preamble is preferably detected if a peak in that set of intervals exceeds a certain threshold θ.

The matched filter output y(n) for the filter corresponding to the root sequence with index u is given by $$y(n) = \sum_i h_i \left( \sum_{m=0}^{N_{ZC}-1} x_u(m + C_v - l_i) x_u(m)^* e^{j2\pi f T_s m} \right) + \sum_{m=0}^{N_{ZC}-1} w(m) x_u(m)^* \qquad (2)$$

$$= \sum_i h_i P_{x_u}(C_v - l_i, f/\Delta f) + \tilde{w}(n)$$

where $P_{x_u}(a, b)$ denotes an auxiliary periodic ambiguity function of $x_u(n)$ which is defined as $$P_{x_u}(a, b) \equiv \sum_{m=0}^{N_{ZC}-1} x_u(m+a) x_u(m)^* e^{j\frac{2\pi b m}{N_{ZC}}}$$

$$= \sum_{m=0}^{N_{ZC}-1} x_u(m) x_u(m-a)^* e^{j\frac{2\pi b(m-a)}{N_{ZC}}},$$

where $\tilde{w}(n) = \sum_{m=0}^{N_{ZC}-1} w(m) x_u(m)^*$ is the post-receiver noise, and $\Delta f \equiv 1/T_{SEQ} = 1250$ Hz for $T_{SEQ} = 0.8$ ms.

The inventors of the enclosed embodiments have from (2) come to the conclusion that the location of the peaks due to one channel tap is given by the peaks of the periodic ambiguity function for the given frequency offset cyclically shifted according to the cyclic shift of the preamble and the delay of the channel tap.

The above defined periodic ambiguity function $P_{x_u}(a, b)$ of the root sequence $x_u(n)$ may be rewritten as follows:

$$P_{x_u}(a, b) = \sum_{m=0}^{N_{ZC}-1} x_u(m) x_u(m-a)^* e^{j\frac{2\pi}{N_{ZC}} b(m-a)} \qquad (3)$$

$$= e^{-j\frac{2\pi}{N_{ZC}} ba} \sum_{m=0}^{N_{ZC}-1} e^{-j\frac{\pi}{N_{ZC}}(um(m+1)-u(m-a)(m-a+1)-2bm)}$$

$$= e^{j\frac{\pi u a(a-1)-2\pi b a}{N_{ZC}}} \sum_{m=0}^{N_{ZC}-1} e^{-j\frac{2\pi}{N_{ZC}}(au-b)m}$$

$$= e^{j\frac{\pi u a(a-1)-2\pi b a}{N_{ZC}}} S(au-b)$$

where $$S(t) = \sum_{m=0}^{N_{ZC}-1} e^{\frac{-j2\pi m t}{N_{ZC}}}.$$

S(t) is hence a geometric series and can be written explicitly as $$S(t) = \begin{cases} N_{ZC}, & t = 0 \bmod N_{ZC} \\ e^{-j\frac{\pi t}{N_{ZC}}(N_{ZC}-1)} \frac{\sin(\pi t)}{\sin\left(\frac{\pi}{N_{ZC}} t\right)}, & t \neq 0 \bmod N_{ZC} \end{cases} \qquad (4)$$

Figure 7:
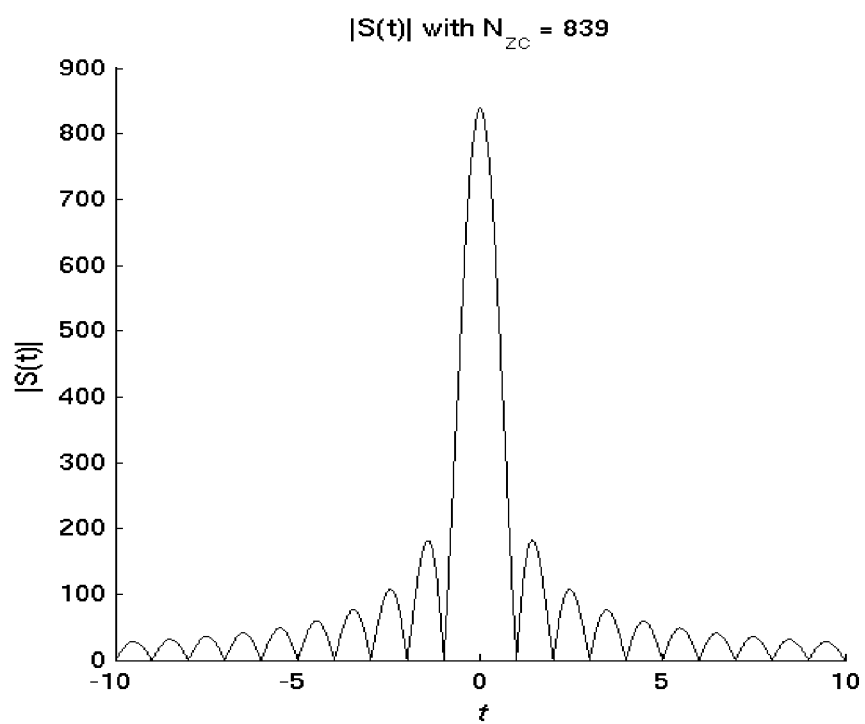
FIG. 7 schematically illustrates part of a periodic ambiguity function.

In particular S(t)=0 for all non-zero integers t, not being multiples of $N_{ZC}$. The absolute value of S(t) is shown in FIG. 7 for $N_{ZC}$=839 which is used in E-UTRA and for a range of values of t close to o where it can be seen that there is a peak at t=0.

Considering now a random access preamble without cyclic shift and received without delay, it follows from inserting (3) and (4) in (2) that, if noise is neglected, the absolute value of the matched filter output y(n) is proportional to $$|P_{x_u}(a, f/\Delta f)| = \begin{cases} N_{ZC} & f/\Delta f = au \bmod N_{ZC} \\ \frac{|\sin(\pi f/\Delta f)|}{\left|\sin\left(\frac{\pi}{N_{ZC}}(au - f/\Delta f)\right)\right|}, & f/\Delta f \neq au \bmod N_{ZC} \end{cases} \qquad (5)$$

The numerator in the second expression in (5) follows from the fact that a and u are integers so that $$\sin(\pi(au - f/\Delta f)) = \sin(\pi au)\cos(\pi f/\Delta f) - \cos(\pi au)\sin(\pi f/\Delta f)$$

$$= (-1)^{au+1} \sin(\pi f/\Delta f).$$

Let p be the inverse modulo $N_{ZC}$ of u, i.e. p is the integer $0 < p < N_{ZC}$ such that $(pu) \bmod N_{ZC} = 1$. In E-UTRA $N_{ZC}$ is a prime so that each integer u, $0 < u < N_{ZC}$, has an inverse modulo $N_{ZC}$. Then, for any integer k, there is a value $a = (kp) \bmod N_{ZC}$ such that $$au \bmod N_{ZC} = ((kp)u) \bmod N_{ZC}$$

$$= (k(pu)) \bmod N_{ZC}$$

$$= ((k \bmod N_{ZC}) \cdot ((pu) \bmod N_{ZC})) \bmod N_{ZC}$$

$$= k \bmod N_{ZC}.$$

The condition $f/\Delta f = au \bmod N_{ZC}$ in (5) is then fulfilled for some integer a for every integer k so that a frequency offset of $k \cdot \Delta f$ causes a peak in the matched filter output at $n = a = kp \bmod N_{ZC}$ and zero output for all other values of n. Hence, if a peak due to a received preamble appears in the matched filter output y at $n = n_0$ for f=0, the peak will appear at $n = (n_0 + p) \bmod N_{ZC}$ for $f = \Delta f$, and at $n = (n_0 - p) \bmod N_{ZC}$ for $f = -\Delta f$.

For the derivation of the frequency offset estimation determination it is useful to define an auxiliary variable $z(k, f) = |P_{x_u}(kp, f/\Delta f)|$. Equation (5) then gives $$z(k, f) = \begin{cases} N_{ZC}, & f = k \cdot \Delta f \\ \frac{|\sin(\pi f/\Delta f)|}{\left|\sin\left(\frac{\pi}{N_{ZC}}(k - f/\Delta f)\right)\right|}, & f \neq k \cdot \Delta f \end{cases} \qquad (6)$$

Figure 8:
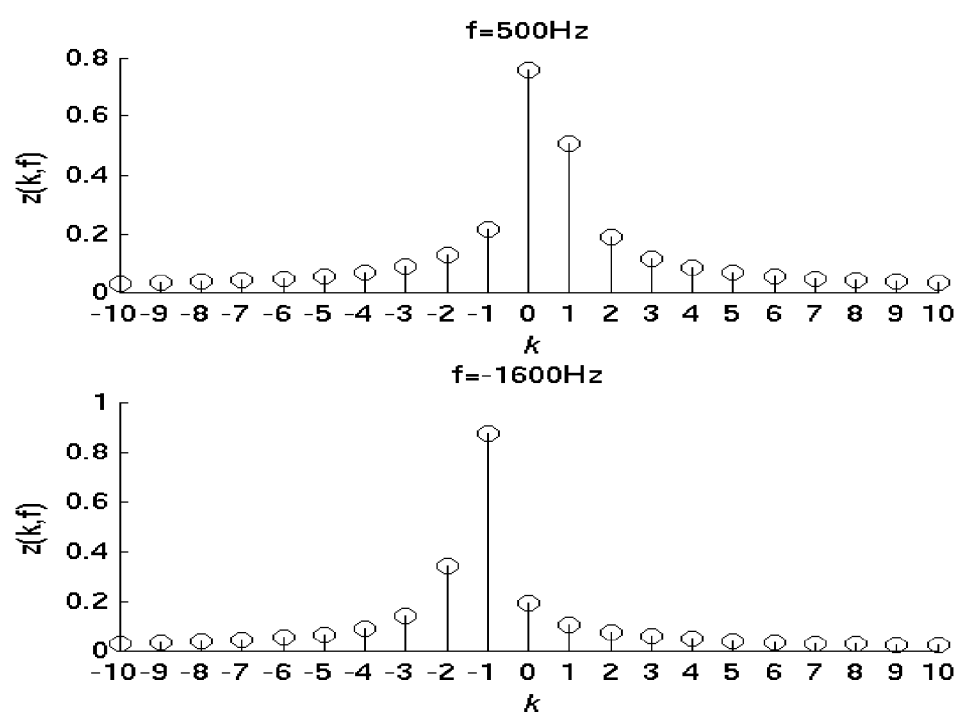
FIG. 8 schematically illustrates simulation results for some values of a frequency offset.

As an example, in FIG. 8a simulation result of z is plotted for some values of the frequency offset f. It can be seen that several peaks may appear in the matched filter output due to one received preamble even when there is only a single channel tap. In the top plot of FIG. 8 the highest (i.e. maximum) peak is located at k=0 (i.e. $k_0$=0) and the second highest peak is located at k=+1 corresponding to a frequency f=1250 Hz. Thus in this case the frequency offset to be estimated is in the range 0-1250 Hz. In the bottom plot of FIG. 8 the highest (i.e. maximum) peak is located at k=−1 (i.e. $k_0$=−1) corresponding to a frequency f=−1250 Hz and the second highest peak is located at k=−2 corresponding to a frequency f=−2500 Hz. Thus in this case the frequency offset to be estimated is in the range −2500 to −1250 Hz.

If not considered, the relocation of peaks due to frequency offset can cause missed and false detections. E-UTRA defines a restricted set of cyclic shifts to ensure proper preamble detection in cells with fast moving mobile terminals 18. By configuring the restricted set the primary (i.e., k=0) and secondary (i.e., k=±1) peaks for a preamble are guaranteed not to coincide with a primary or secondary peak of any other preamble, if the maximum delay is within certain limits. This means that a peak in the matched filter output can be uniquely attributed to a value k∈{−1,0,1}, subsequently referred to as its k-value.

If the frequency offset is not exactly f=k·Δf it is clear from (6) and FIG. 8 that there will be several smaller peaks in the matched filter output with the largest peaks for the values of k closest to f/Δf and therefore the amplitude of those peaks are useful for estimating the frequency offset. Preferably the first peak is a maximum peak in the output sequence. Alternatively the second peak may be a maximum peak in the output sequence. The first peak and/or the second peak may be associated with weighting factors (denoted $w_1$ and $w_2$), step S10. The weighting factors may have one and the same value. Alternatively the second weighting factor is different from the first weighting factor.

The following variables are now defined:
 $n_{max}$ denotes the sample of the largest peak in the matched filter output within the set of intervals for a random access preamble
 $k_0$ is defined as the k-value of the largest peak in the set of intervals for the random access preamble of interest
 Δk indicates the k-value of the largest peak of the ones with k-value equal to $k_0$+1 and $k_0$−1. That is: Δk=sgn (|y(($n_{max}$+p)mod $N_{ZC}$)|−|y(($n_{max}$−p)mod $N_{ZC}$)|), where sgn(x) is the signum function, wherein the signum function equals 1 for x>0, equals o for x=0, and equals −1 for x<0.

In general, in a step S8 a frequency offset estimate based on a ratio of the first peak and the second peak is determined. In more detail, from the above derivation follows that if Δk=0, the peaks corresponding to ($k_0$+1)Δf and ($k_0$−1)Δf have exactly the same magnitude and the estimated frequency offset may be determined as $$\hat{f} = k_0 \cdot \Delta f. \quad (7)$$

Otherwise Δk∈{−1, 1} and the PRACH frequency offset determination generally is based on the ratio q of the amplitude of the matched filter output at ($n_{max}$+Δk·p)mod $N_{ZC}$ and the output at $n_{max}$. That is:

$$q = |y(n_{max}+\Delta k \cdot p \bmod N_{ZC})|/|y(n_{max})|.$$

As described above the values of the matched filter output samples ($n_{max}$+Δk·p)mod $N_{ZC}$ and $n_{max}$ may correspond to the same preamble and the same delay. This is particularly likely if there is a strong peak at $n_{max}$. Therefore the ratio of the amplitude of the matched filter output at these samples, in absence of noise, is given by the ratio of z($k_0$+Δk, f) and z($k_0$, f). Define now g as the ratio of z($k_0$+Δk, f) and z($k_0$, f). That is:

$$g = \frac{z(k_0 + \Delta k, f)}{z(k_0, f)}. \quad (8)$$

The parameter g is thus related to properties of the preamble sequence. From (6), g is then given by $$g = \frac{z(k_0 + \Delta k, f)}{z(k_0, f)} = \left| \frac{\sin(\pi(k_0 - f/\Delta f)/N_{ZC})}{\sin(\pi(k_0 + \Delta k - f/\Delta f)/N_{ZC})} \right|. \quad (9)$$

The expression for g can be simplified by approximating the sine function with the first term of Taylor's series of the sine function, i.e. by replacing sin(t) by t, an approximation that is accurate when t<<1. The frequency offset estimate may then further be based on a linearization of an expression for the parameter g. In E-UTRA $N_{ZC}$=839 so that the arguments of the sine in (9) are small enough to only retain the first term in the Taylor's series of the sine function. From FIG. 7 and the definition of z(k, f) follows that significant peaks in the matched filter output appear when k≤f/Δf is of the order of 1. The expression for g is then simplified to:

$$g = \left| \frac{k_0 - f/\Delta f}{k_0 + \Delta k - f/\Delta f} \right|. \quad (10)$$

From FIG. 7 and the definition of the periodic ambiguity function given above one can assume that f/Δf is between $k_0$ and $k_0$+Δk so that $$\frac{k_0 - f/\Delta f}{k_0 + \Delta k - f/\Delta f} \leq 0.$$

The expression for g is then further simplified to $$g = -\frac{k_0 - f/\Delta f}{k_0 + \Delta k - f/\Delta f}. \quad (11)$$

Solving (11) for the frequency offset f yields:

$$f = \Delta f \left( k_0 + g \frac{\Delta k}{1+g} \right). \quad (12)$$

According to one embodiment the impact of noise on the matched filter output is ignored and the estimated frequency offset $\hat{f}$ is obtained from (12) as $$\hat{f} = \Delta f \left( k_0 + q \frac{\Delta k}{1+q} \right). \quad (13)$$

From inspection of the terms present in (13) thus follows that the frequency offset estimate may depend on an index $k_o$ to the largest peak in the output sequence, a ratio q of the amplitude of the output sequence at a first index and a second index, an index $k_0+\Delta k$ to the largest peak of two peaks being adjacent said largest peak at index $k_o$ in the output sequence, and a parameter $\Delta f=1/T$, where T denotes time duration for transmitting the preamble sequence. From the above derivation also follows that q preferably depends on the value $n_{max}$ of the largest peak at index $k_o$ and the number $N_{ZC}$ of samples in the preamble sequence.

Comparing (7) and (13), it is clear that (13) is valid also for $\Delta k=0$.

When considering the above noted weighting factors $w_1$ and $w_2$, which preferably are based on the ratio of the first peak and the second peak, the estimated frequency offset $\hat{f}$ may be written as:

$$\hat{f} = w_1 k_0 \Delta f + w_2 (k_0 + \Delta k) \Delta f \quad (14)$$

where $w_1 = \dfrac{1}{1+q}$ and $w_2 = \dfrac{q}{1+q}$.

According to one embodiment also noise (such as channel noise and/or noise generated in the receiver 14) is taken into consideration: g is approximated by q in (12) only if $y(n_{max}+\Delta k \cdot p \bmod N_{ZC})$ is greater than a certain threshold $\theta$, otherwise $z(k_0+\Delta k, f)$ and hence g is set to 0. The threshold parameter $\theta$ may be set to zero, i.e. according to an embodiment $\theta=0$. In the former case (13) is valid, in the latter case $$\hat{f}=k_0 \cdot \Delta f. \quad (15)$$

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for estimating a frequency offset between a mobile communication terminal and a network node, the method being performed in said network node, comprising the steps of:
   receiving a preamble sequence for random access on a physical random access channel, PRACH, originating from said mobile communication terminal;
   processing said preamble sequence for random access, thereby generating an output sequence comprising at least one delay line;
   determining a first peak in said output sequence and a second peak in said output sequence, wherein said first peak and said second peak correspond to the same at least one delay line in the output sequence;
   determining a frequency offset estimate based on a ratio of an amplitude of said first peak and an amplitude of said second peak; and
   applying frequency compensation, using the determined frequency offset estimate, to an uplink communication received from the mobile communication terminal.

2. The method according to claim 1, wherein said first peak is a maximum peak in said output sequence.

3. The method according to claim 1, wherein said second peak is a maximum peak in said output sequence.

4. The method according to claim 1, further comprising, based on said ratio, associating said first peak with a first weighting factor and associating said second peak with a second weighting factor.

5. The method according to claim 1, wherein the second weighting factor is different from the first weighting factor.

6. The method according to claim 1, wherein said first peak and said second peak are related by a parameter g relating to properties of said preamble sequence.

7. The method according to claim 6, wherein said frequency offset estimate is further based on a linearization of an expression for said parameter g.

8. The method according to claim 1, wherein said frequency offset estimate depends on an index $k_0$ to the largest peak in said output sequence, a ratio q of the amplitude of said output sequence at a first index and a second index, an index $k_0+\Delta k$ to the largest peak of two peaks being adjacent said largest peak at index $k_0$ in said output sequence, and a parameter $\Delta f=1/T$, where T denotes time duration for transmitting said preamble sequence.

9. The method according to claim 8, wherein q depends on the value $n_{max}$ of said largest peak at index $k_0$ and the number $N_{ZC}$ of samples in said preamble sequence.

10. The method according to claim 9, wherein $q=|y(n_{max}+\Delta k \cdot p \bmod N_{ZC})|/|y(n_{max})|$, where $y(t)$ denotes said output sequence at index t, and where p is an integer.

11. The method according to claim 6, wherein said frequency offset estimate is determined as $$\hat{f} = \Delta f\left(k_0 + g\frac{\Delta k}{1+g}\right).$$

12. The method according to claim 11, further comprising comparing $y(n_{max}+\Delta k \cdot p \bmod N_{ZC})$ to a predetermined threshold value $\theta$, and wherein said frequency offset estimate is determined as $\hat{f}=k_0 \cdot \Delta f$ when $y(n_{max}+\Delta k \cdot p \bmod N_{ZC})<\theta$ or when $\Delta k=0$.

13. The method according to claim 12, wherein $\theta=0$.

14. The method according to claim 1, wherein said processing is performed by filtering, by a matched filter, said received preamble sequence for random access, the matched filter generating said output sequence.

15. The method according to claim 14, wherein said matched filter comprises filter taps, the values of which are matched to said preamble sequence for random access.

16. A network node for estimating a frequency offset between a mobile communication terminal and said network node, comprising
   a receiver arranged to receive a preamble sequence for random access on a physical random access channel, PRACH, originating from said mobile communication terminal;
   a processing unit arranged to process said preamble sequence for random access, thereby generating an output sequence comprising at least one delay line;
   said processing unit further being arranged to determine a first peak in said output sequence and a second peak in said output sequence, wherein said first peak and said second peak correspond to the same at least one delay line in the output sequence;
   said processing unit further being arranged to determine said frequency offset estimate based on a ratio of an amplitude of said first peak and an amplitude of said second peak; and
   said processing unit further being arranged to apply frequency compensation, using the determined frequency offset estimate, to an uplink communication received from the mobile communication terminal.

17. A computer program product comprising instructions stored on non-transient computer-readable media which, when executed by a processor, perform the acts of:

receiving a preamble sequence for random access on a physical random access channel, PRACH, originating from said mobile communication terminal;

processing said preamble sequence for random access, thereby generating an output sequence comprising at least one delay line;

determining a first peak in said output sequence and a second peak in said output sequence, wherein said first peak and said second peak correspond to the same at least one delay line in the output sequence;

determining said frequency offset estimate based on a ratio of an amplitude of said first peak and an amplitude of said second peak; and applying frequency compensation, using the determined frequency offset estimate, to an uplink communication received from the mobile communication terminal.

18. The computer program product of claim 17, wherein said frequency offset estimate depends on an index $k_0$ to the largest peak in said output sequence, a ratio q of the amplitude of said output sequence at a first index and a second index, an index $k_0+\Delta k$ to the largest peak of two peaks being adjacent said largest peak at index $k_0$ in said output sequence, and a parameter $\Delta f=1/T$, where T denotes time duration for transmitting said preamble sequence.

* * * * *